United States Patent [19]

Beall et al.

[11] Patent Number: 5,328,874
[45] Date of Patent: Jul. 12, 1994

[54] ZINC SULFOPHOSPHATE GLASSES

[75] Inventors: George H. Beall, Big Flats; Joseph E. Pierson, Painted Post, both of N.Y.

[73] Assignee: Corning Incorporated, Corning, N.Y.

[21] Appl. No.: 136,893

[22] Filed: Oct. 18, 1993

[51] Int. Cl.$^5$ ................................................. C03C 3/16
[52] U.S. Cl. ......................................... 501/45; 501/44; 501/46
[58] Field of Search ................. 501/43, 44, 45, 46, 501/48

[56] References Cited

U.S. PATENT DOCUMENTS

| | | | |
|---|---|---|---|
| 4,544,695 | 10/1985 | Myers | 501/45 |
| 4,940,677 | 7/1990 | Beall et al. | 501/45 |
| 5,043,369 | 8/1991 | Bahn et al. | 523/466 |
| 5,071,795 | 12/1991 | Beall et al. | 501/45 |
| 5,218,035 | 6/1993 | Liu | 501/45 |

FOREIGN PATENT DOCUMENTS 9107357  5/1991  World Int. Prop. O. ... C03C 3/160

*Primary Examiner*—Mark L. Bell
*Assistant Examiner*—Deborah Jones
*Attorney, Agent, or Firm*—Timothy M. Schaeberle; Clinton S. Janes, Jr.

[57] ABSTRACT

This invention relates to the preparation of a glass exhibiting a transition temperature normally below about 300°, a working temperature below about 400°, while, at the same time, exhibiting excellent resistance to attack by water. Specifically, the present invention discloses a glass consisting essentially in terms of mole percent on the oxide basis, of 15-35% $P_2O_5$, 1-25% $SO_3$, 30-55% ZnO, 0-25% $R_2O$, wherein $R_2O$ is selected from the group consisting of 0-25% $Li_2O$, 0-25% $Na_2O$, and 0-25% $K_2O$, and up to a total of 15% of optional ingredients in the indicated proportions selected from the group consisting of 0-10% $Al_2O_3$, 0-10% MgO, 0-10% CaO, 0-10% SrO, 0-10% BaO, 0-10% MnO, 0-10% transition metal oxides and 0-15% Cl+F, as analyzed in weight percent.

5 Claims, No Drawings

ZINC SULFOPHOSPHATE GLASSES

FIELD OF THE INVENTION

The present invention relates to a zinc-sulfophosphate glass exhibiting an extremely low softening point of about less than 300° C. and exhibiting excellent resistance to moisture attack.

BACKGROUND OF THE INVENTION

Considerable research has been conducted in the past to devise inorganic glasses exhibiting low transition temperatures (Tg), thereby enabling melting and forming operations to be carried out at low temperatures with consequent savings in energy costs. As conventionally defined, the transition temperature of a glass is that temperature at which notable increase in thermal expansion coefficient is recorded, accompanied by a change in specific heat ($C_p$). More recently, it has been recognized that glasses demonstrating low transition temperatures are potentially useful materials for a host of applications including low temperature sealing glasses and glass-organic polymer composites. A very recent development disclosed in U.S. Pat. No. 5,043,369 (Bahn et al.) involves the production of glass-organic polymer alloys. Those alloys are prepared from a glass and a thermoplastic or thermosetting polymer having compatible working temperatures. Thus, the glass and the polymer are combined at the working temperature to form an intimate mixture; that is, the glass and polymer are in a sufficiently fluid state to be co-formed together to form a body displaying an essentially uniform, fine-grained microstructure in which, desirably, there is at least partial miscibility and/or a reaction between the glass and the polymer to promote adhesion and bonding therebetween. An article is shaped from the blend and then cooled to room temperature. Such articles exhibit chemical and physical properties comprising a complementary blend of those demonstrated by the particular glass and polymer. For example, the alloys frequently display a combination of high surface hardness, high stiffness, and high toughness. Alloys are distinguished from glass/organic polymer composites in that there is at least partial miscibility and/or a reaction between the glass and polymer which condition(s) is absent in glass/polymer composites.

Glasses having base compositions within the general zinc phosphate system have been found to be especially suitable for the glass component of glass-polymer alloys. Two illustrations of recent research in that composition system are reported below.

U.S. Pat. No. 4,940,677 (Beall et al.) discloses glasses exhibiting transition temperatures below 450° C., preferably below 350° C., consisting essentially, in mole percent, of at least 65% total of 23–55% ZnO, 28–40% $P_2O_5$, and 10–35% $R_2O$, wherein $R_2O$ consists of at least two alkali metal oxides in the indicated proportions selected from the group of 0–25% $Li_2O$, 0–25% $Na_2O$, and 0–25% $K_2O$, and up to 35% total of optional constituents in the indicated proportions selected from the group of 0–6% $Al_2O_3$, 0–8% $B_2O_3$, 0–8% $Al_2O_3$+$B_2O_3$, 0–15% $Cu_2O$, 0–5% F, 0–35% PbO, 0–35% SnO, 0–35% PbO+SnO, 0–5% $ZrO_2$, 0–4% $SiO_2$ and 0–15% MgO+CaO+SrO+BaO+MnO, consisting of 0–10% MgO, 0–10% CaO, 0–10% SrO, 0–12% BaO, and 0–10% MnO.

U.S. Pat. No. 5,071,795 (Beall et al.) illustrates glasses exhibiting transition temperatures no higher than 350° C. consisting essentially, in mole percent, of about 0–25% $Li_2O$, 25–50% ZnO, 5–20% $Na_2O$, 0–3% $Al_2O_3$ 0–12% $K_2O$, 25–37% $P_2O_5$ 0–10% SrO, with the amount of $Li_2O$+$Na_2O$+$K_2O$ ranging from 15–35%. In addition, the composition may include 0.5–8% Cl and 0–5% F, as analyzed in weight percent, and up to 10% $Cu_2O$, up to 3% $SiO_2$, and up to 8% total of at least one alkaline earth metal oxide may be included.

The above-described zinc phosphate glasses demonstrate relatively excellent resistance to chemical attack when compared to other phosphate-based glasses. Nevertheless, the search has been continuous to discover new glass compositions manifesting low transition temperatures with even greater chemical durability. Not only would these lower temperature glass compositions result in lower energy costs attributed the glass formation, they would also result in lower costs attributed to formation of glass/polymer alloys and composites. In addition, lower temperature durable glasses would also increase the number of compatible polymers available which could be co-processed with the glass to form glass/polymer composites and thermally co-deformed with the glass to form glass/polymer alloys. These factors, lowered formation cost and increase in potential polymers choices, would, in turn, likely increase the number of potential commercial applications.

SUMMARY OF THE INVENTION

The above described research has led to the invention of a glass exhibiting a transition temperature normally below about 300°, a working temperature below about 400°, while, at the same time, exhibiting excellent resistance to attack by water.

More specifically, the present invention discloses a glass consisting essentially in terms of mole percent on the oxide basis, of 15–35% $P_2O_5$, 1–25% $SO_3$, 30–55% ZnO, 0–25% $R_2O$, wherein $R_2O$ is selected from the group consisting of 0–25% $Li_2O$, 0–25% $Na_2O$, and 0–25% $K_2O$. Additionally, up to a total of 15% of optional ingredients in the indicated proportions may be selected from the group consisting of 0–10% $Al_2O_3$, 0–10% MgO, 0–10% CaO, 0–10% SrO, 0–10% BaO, 0–10% MnO, 0–10% transition metal oxides and 0–15% Cl+F, as analyzed in weight percent.

Whereas complete conversion of the above inventive composition ranges expressed in terms of mole percent to ranges expressed in terms of weight percent is not mathematical possible, the following are the inventive compositions as expressed in terms of approximate weight percent: 25–50% $P_2O_5$, 1–20% $SO_3$, 26–45% ZnO, 0–20% $R_2O$, wherein $R_2O$ is selected from the group consisting of 0–8% $Li_2O$, 0–20% $Na_2O$, and 0–20% $K_2O$. The group from which the optional ingredients may be selected from, as expressed in terms of approximate weight percent, is as follows: 0–10% $Al_2O_3$, 0–5% MgO, 0–5% CaO, 0–10% SrO, 0–15% BaO, 0–10% MnO, 0–15% transition metal oxides and 0–15% Cl+F, as analyzed.

PRIOR ART

U.S. Pat. No. 4,544,695 (Meyers) discloses a flame and/or smoke retardant polymeric composition which includes a phosphate-sulfate glass composition containing the following components: 4–18% $K_2SO_4$, 8–36% $ZnSO_4$, 4–18% $Na_2SO_4$, and 19–56% $P_2O_5$. In addition, the glass may include the following optional components: 0–25% ZnO, 0–4% $B_2O_3$, 0–25% $Li_2O$, 0–25%

Na₂O, 0-12% BaO and 0-4% TiO₂. In the three glass examples cited therein, the total amount of ZnO (combined from sources of ZnSO₄ and ZnO) is far below that required in the present inventive compositions; the highest ZnO cited is 18.5%. Even if the zinc oxide level claimed therein is raised enough to fall within the present inventive glasses, the required ranges of the Meyers patent will produce either a glass too high in sulfate to exhibit good durability, or too low in alkali to result in a glass with a low enough glass transition temperature. Thus, the glasses, both the examples cited and any other glass within the claimed range of the patent, exhibit either extremely poor durability or too high a transition temperature when compared to the instant inventive glasses. This being the case, these glasses are rendered useless in the applications envisioned for the present glasses; that of a component for use in glass/polymer alloys and composites. Furthermore, the inventive glasses, when expressed in the composition form used in the Meyers reference, fall outside the claimed composition range disclosed therein.

DESCRIPTION OF THE PREFERRED EMBODIMENTS

Table I records a number of glass compositions, expressed in terms of mole percent on the oxide basis, operable in the present invention. Table IA reports the same compositions, but wherein the values of the individual components have been converted to weight percent. In addition to reporting the relative amounts of the batch constituents, Table I reports the transition temperature ($T_g$) in terms of °C., as measured by employing standard differential scanning calorimetry techniques, the dissolution rate expressed in terms of percentage weight loss (% wt loss) of a tab of approximate dimensions of about 1"×1¼"×⅜" (2½ cm×4 cm×1 cm) and the working temperature (pull temp.). In addition, the appearance of the glass after formation is reported in Table I (Glass appear.); the quality and appearance of the glass formed ranged from clear (cl.) to slightly hazy (hazy). The actual batch ingredients for the glasses can comprise any materials, either the oxides or other compounds, which, upon being melted together, will be converted into the desired oxides in the proper proportions. For example ZnSO₄.7H₂O is conveniently employed as the source of SO₃ as well as a partial source of ZnO.

The batch materials were compounded, automatically tumble-mixed in order to secure a homogeneous melt, and placed into silica crucibles. The glass batch was then melted and maintained at temperatures ranging from 800° to 1000° for times of about three hours. Very little volatilization of P₂O₅, SO₃ or other species was noted below about 850° C. Table I reports that the analyzed values of SO₃ (A-SO₃) were typically about equal to that calculated from the batch (B-SO₃); values reported in weight percent. The melt was then poured into a steel mold to produce a rectangular slab having dimensions of about 4"×8"×⅜" (10 cm×20×1 cm) and that slab subsequently annealed overnight at temperature of about 250° to 275° C.

Rectangular tab-shaped pieces weighing approximately 40 grams were cut from the slab, heated to tempertures within the range of 350° to 450° C., and glass cane was hand drawn to obtain a close approximation of the working temperature. This value, for glass Examples 1-14, is reported in Table I as the "Pull temp.".

Samples were cut from the glass slab for testing the moisture resistance/durability thereof. The test involved weighing each sample carefully and then immersing the sample into a bath of boiling water. After a residence time of six hours, the sample was removed from the bath, dried in the ambient environment, and thereafter reweighed to determine any loss of weight by the sample. This loss of weight, i.e., the dissolution rate, for each glass sample is reported in Table I (Dissol. rate) and is calculated as a percentage of the original untested/unimmersed weight.

TABLE I

|  | 1 | 2 | 3 | 4 | 5 | 6 | 7 | 8 | 9 | 10 | 11 | 12 |
|---|---|---|---|---|---|---|---|---|---|---|---|---|
| P₂O₅ | 26.0 | 22.7 | 19.5 | 24.3 | 26.4 | 24.8 | 23.1 | 26.4 | 25.0 | 25.0 | 30.0 | 23.0 |
| SO₃ | 10.0 | 15.0 | 20.0 | 15.7 | 10.0 | 12.5 | 15.0 | 15.0 | 15.0 | 15.0 | 12.5 | 12.5 |
| Al₂O₃ | 1.6 | 1.4 | 1.2 | 1.4 | 1.6 | 1.5 | 1.4 | 1.6 | — | — | 2.0 | 1.5 |
| Li₂O | 6.4 | 5.6 | 4.8 | 5.8 | 5.6 | 5.3 | 4.9 | 5.6 | — | — | 5.0 | 5.5 |
| Na₂O | 9.7 | 9.5 | 9.3 | 9.0 | 8.0 | 8.0 | 8.0 | 8.0 | — | — | 8.0 | 8.0 |
| K₂O | 6.4 | 6.7 | 6.9 | 6.0 | 5.7 | 5.8 | 6.0 | 5.7 | — | — | 4.0 | 5.5 |
| ZnO | 38.1 | 36.9 | 35.7 | 35.9 | 41.6 | 40.7 | 39.9 | 40.7 | 45.0 | 40.0 | 38.5 | 42.5 |
| CaO | 1.3 | 1.5 | 1.6 | 1.3 | 0.6 | 0.7 | 1.0 | 0.6 | — | — | — | 0.75 |
| SrO | 0.6 | 0.8 | 1.1 | 0.5 | 0.6 | 0.7 | 1.0 | 0.6 | — | — | — | 0.75 |
| ZnCl₂ | — | — | — | — | — | — | — | — | 15.0 | 20.0 | — | — |
| Melt. temp. (°C.) | 800 | 800 | 800 | 800 | 800 | 800 | 800 | 800 | — | 1000 | 850 | 825 |
| Glass Appear. | cl. | hazy | cl. | hazy | cl. | cl. | cl. | cl./hazy | cl. | cl. | cl. | cl. |
| $T_g$ (°C.) | — | — | — | 288 | 286 | 276 | 283 | — | — | — | — | — |
| Pull (°C.) | 385 | — | 375 | 380 | 400 | 385 | 375 | 390 | — | — | 400 | 405 |
| Dissolution Rate (% wt. loss) | 0.02 | 0 | 0.15 | 0.03 | 0 | 0 | 0.12 | 0.0 | — | — | 0.0 | 0.02 |
| A - SO₃ | 8.7 | 13.4 | 18.0 | 13.4 | — | — | — |  |  |  |  |  |
| B - SO₃ | 8.6 | 13.2 | 17.9 | 12.9 | — | — | — |  |  |  |  |  |

TABLE IA

|  | 1 | 2 | 3 | 4 | 5 | 6 | 7 | 8 | 9 | 10 | 11 | 12 |
|---|---|---|---|---|---|---|---|---|---|---|---|---|
| P₂O₅ | 39.8 | 33.3 | 30.9 | 37.5 | 39.9 | 37.8 | 35.6 | 38.3 | 34.0 | 33.1 | 44.3 | 35.6 |
| SO₃ | 8.6 | 13.2 | 17.9 | 13.7 | 8.5 | 10.7 | 13.0 | 12.2 | 11.5 | 11.2 | 10.4 | 10.9 |
| Al₂O₃ | 1.7 | 1.5 | 1.3 | 1.6 | 1.7 | 1.6 | 1.5 | 1.6 | — | — | 2.1 | 1.6 |
| Li₂O | 2.0 | 1.9 | 1.6 | 1.9 | 1.8 | 1.7 | 1.6 | 1.7 | — | — | 1.6 | 1.7 |
| Na₂O | 6.5 | 6.5 | 6.5 | 6.1 | 5.3 | 5.4 | 5.4 | 5.1 | — | — | 5.2 | 5.4 |
| K₂O | 6.5 | 6.9 | 7.3 | 6.1 | 5.7 | 5.9 | 6.2 | 5.5 | — | — | 4.0 | 5.7 |
| ZnO | 33.4 | 32.9 | 32.4 | 31.8 | 36.1 | 35.6 | 35.3 | 34.6 | 35.0 | 30.3 | 32.5 | 37.7 |
| CaO | 0.8 | 0.9 | 1.0 | 0.8 | 0.3 | 0.4 | 0.4 | 0.3 | — | — | — | 0.4 |
| SrO | 0.6 | 0.9 | 1.2 | 0.6 | 0.6 | 0.8 | 0.9 | 0.6 | — | — | — | 0.9 |

TABLE IA-continued

|  | 1 | 2 | 3 | 4 | 5 | 6 | 7 | 8 | 9 | 10 | 11 | 12 |
|---|---|---|---|---|---|---|---|---|---|---|---|---|
| $ZnCl_2$ | — | — | — | — | — | — | — | — | 19.5 | 25.4 | — | — |

Whereas the above description reflects laboratory melting and forming practice only, it will be appreciated that the recited compositions are capable of being melted in large scale melting units and shaped into desired configurations utilizing forming techniques conventional in the glassmaking art. As is the case with standard glassmaking practice, it is only necessary to ensure that the batch materials are mixed together thoroughly and then melted at temperatures which will ensure a homogenous melt without excessive volatilization of sulfide oxides, chloride and fluoride, and that the melt is thereafter cooled and shaped into a glass body of a desired geometry which is customarily annealed.

These inventive glasses possessing transition temperatures normally below about 300° C. and working temperatures of 350° and above, exhibit measures of durability/resistance to moisture ranging from 0.0 to 0.15 percent weight loss when immersed in boiling water for six (6) hours. These weight loss values are exceptionally low for glasses with transition/working temperatures in the range which these inventive glasses exhibit; they are comparable to those measures of durability exhibited by glasses possessing transition/working temperatures as much as 100° C. greater, e.g., those phosphate glasses disclosed in U.S. Pat. No. 4,940,677 (Beall et al.)

Based upon an overall balance of physical and chemical properties, Example 6 is the most preferred embodiment of the inventive glasses.

Table II reports the composition of three typical metaphosphate glasses, exhibiting transition temperatures comparable to those exhibited by the inventive glasses. It is clear from the durability data reported therein (only a 1 hour immersion in boiling water), ranging from a 5% weight loss to a complete dissolving of the glass, that the inventive glasses exhibit a much greater durability than these metaphosphate samples possessing comparable transition temperatures.

TABLE II

|  | 13 | 14 | 15 |
|---|---|---|---|
| $P_2O_5$ | 46 | 46 | 46 |
| $Al_2O_3$ | 4 | 4 | 4 |
| $Li_2O$ | 25 | — | 25 |
| $Na_2O$ | 25 | 25 | — |
| $K_2O$ | — | 25 | 25 |
| Dissolution Rate (% wt. loss) | 5.0 | dissolved (100%) | 25 |
| $T_g$ (°C.) | 290 | 260 | 280 |

Table III reports the composition of Examples 1-12 in the form as is used in the earlier-described Meyers reference. In converting the instant examples to this form, it was assumed that first source of the $SO_3$ was $K_2SO_4$; if any $SO_3$ was still needed it was then assumed that it was supplied through the addition of $Na_2SO_4$; and finally if an amount of $SO_3$ was still required it was assumed that its source was $ZnSO_4$. This order of preference for designating the sulfate in terms of $K_2SO_4$, $Na_2SO_4$, and $ZnSO_4$, is clear from Examples 1 and 2 of the Meyers patent. In Example 1, all of the alkali, $K_2O$ and $Na_2O$, is listed in terms of sulfates. The zinc by comparison, is listed as both $ZnSO_4$ and ZnO. In other words, zinc is designated as sulfate up to the total sulfate level desired by the patentee, and the rest of the zinc is listed as the oxide. This could just as easily been accomplished by using all $ZnSO_4$ and listing part of the Na or K as oxides, but the patentee evidently preferred to list the alkali ahead of zinc as sulfates. Similarly, from Example 2, all the potassium is listed as $K_2SO_4$, while both soda and zinc are split between oxides and sulfates. While any arrangement can obviously be used, the patentee prefers K, Na, and Zn as the order of preference in describing his compositions. We have used the same format (order of preference) in Table III.

It is clear from the compositions listed in this table that the inventive glasses are compositionally very distinct from those disclosed in the Meyers et al. reference.

TABLE III

|  | 1 | 2 | 3 | 4 | 5 | 6 | 7 | 8 | 9 | 10 | 11 | 12 |
|---|---|---|---|---|---|---|---|---|---|---|---|---|
| $K_2SO_4$ | 7.1 | 7.9 | 8.7 | 7.1 | 6.3 | 6.6 | 6.7 | 6.4 | — | — | 4.6 | 6.3 |
| $Zn_2SO_4$ | — | — | 4.7 | 0.8 | — | — | 1.1 | 1.3 | 17.6 | 17.6 | 0.6 | — |
| $Na_2SO_4$ | 4.0 | 9.8 | 11.7 | 10.7 | 4.8 | 7.6 | 8.9 | 9.0 | — | — | 9.2 | 8.0 |
| $P_2O_5$ | 28.9 | 26.7 | 24.0 | 28.9 | 29.3 | 28.3 | 25.7 | 29.6 | 29.4 | 29.4 | 34.3 | 26.3 |
| ZnO | 42.3 | 43.4 | 40.1 | 41.8 | 46.2 | 46.5 | 48.3 | 44.2 | 35.3 | 29.4 | 43.4 | 48.6 |
| $Li_2O$ | 7.1 | 6.6 | 6.0 | 6.9 | 6.2 | 6.1 | 5.5 | 6.3 | — | — | 5.7 | 6.3 |
| $Na_2O$ | 6.8 | 1.4 | — | — | 4.1 | 1.5 | — | — | — | — | — | — |
| CaO | 1.4 | 1.8 | 2.0 | 1.5 | 0.7 | 0.8 | 1.1 | 0.7 | — | — | — | 0.9 |
| SrO | 0.7 | 0.9 | 1.4 | 0.6 | 0.7 | 0.8 | 1.1 | 0.7 | — | — | — | 0.9 |
| $ZnCl_2$ | — | — | — | — | — | — | — | — | 17.6 | 23.5 | — | — |
| $Al_2O_3$ | 1.8 | 1.6 | 1.5 | 1.7 | 1.8 | 1.7 | 1.6 | 1.8 | — | — | 2.3 | 1.7 |

Table IV reports a number of glass compositions expressed in terms of mole percent on the oxide basis which are outside the scope of the instant invention, but within the composition range disclosed in the earlier-described Meyers reference. In addition to the composition breakdown and the dissolution rate of the glass, the table reports the melting temperature (Melt. temp.) and the glass appearance, before and after the immersion in the boiling water. The glass, before immersion, ranges in appearance and quality from a clear stable glass (cl.) to a translucent hygroscopic glass (transl./hygro). Table V reports the same compositions though reported in the composition form used in the Meyers patent. These comparison glass examples, 16 to 22 were, except for changing the respective components as shown in Table II, made in the same way as that earlier disclosed for inventive glass Examples 1-12. Note, however, that Example 20 (reported as unmelted) would not melt, thus no glass was formed; this composition would not melt to form a glass even when the melting instructions detailed in the Meyers reference were adhered to.

It is quickly evident that, with the exception of Example 21, these glasses exhibit poor durability measures; either high dissolution rates or hygroscopic behavior. In fact, this durability is poor enough to effectively render these glasses useless for any application envisioned for the inventive glasses. It is important to note that these weight loss percentages are values for various immersion times; Ex. 16 and 17-2½ hrs., Ex. 19-2 hrs, and Ex. 18 and 20-23-6 hrs. As reported in Table II, the examples exhibited weight losses as a result of boiling water immersion ranging from a 0.3% weight loss in 6 hours, to those which either dissolved (dissol.) or were converted into a unconsolidated white residue (unconsol. white res.) or possessed surface spalling (sur. spall.)

Examples 16-18 are specific examples disclosed in the Meyers patent as possessing low hydroscopic behavior; however, the durability values measured show that none of these compositions exhibit or approach the durability as exhibited by the inventive composition. Examples 19 through 23 were various composition attempts in order to identify a glass composition within this reference which would exhibit durability on the order of the inventive sulfophosphate composition's durability. For example, comparison examples 21 and 22 possesses the maximum amount of Zn (highest $ZnSO_4$ and ZnO allowable) and the lowest amount of $P_2O_5$ allowable within the claimed composition range; neither exhibit durability numbers as low as desired. Example 21, while approaching the low dissolution rates of the current invention, is nevertheless far too high in transition temperature (>350° C.) and working temperature (>450° C.) to be useful in the current invention. Simply put, none of the comparison examples, and likely no composition falling within the Meyers reference composition range possesses the requisite high ZnO and sufficiently low $SO_3$ in order to ensure a glass which possesses a $T_g$ of about 300° C. with a corresponding excellent resistance to moisture.

TABLE V

|  | 16 | 17 | 18 | 19 | 20 | 21 | 22 | 23 |
|---|---|---|---|---|---|---|---|---|
| $K_2SO_4$ | 9.7 | 9.7 | 5.3 | 4.0 | 4.0 | 4.0 | 10.0 | 4.0 |
| $Zn_2SO_4$ | 19.5 | 25.6 | 10.6 | 8.0 | 8.0 | 36.0 | 36.0 | 14.0 |
| $Na_2SO_4$ | 9.7 | 28.0 | 5.3 | 4.0 | 4.0 | 4.0 | 10.0 | 4.0 |
| $P_2O_5$ | 36.7 | 36.7 | 55.3 | 56.0 | 19.0 | 31.0 | 19.0 | 32.0 |
| ZnO | 6.1 | — | — | 25.0 | 25.0 | 25.0 | 25.0 | 25.0 |
| $Li_2O$ | 18.3 | — | 7.9 | — | 15.0 | — | — | 7.0 |
| $Na_2O$ | — | — | — | 3.0 | 25.0 | — | — | 14.0 |
| BaO | — | — | 11.8 | — | — | — | — | — |
| $B_2O_3$ | — | — | 3.9 | — | — | — | — | — |

We claim:

1. A glass exhibiting a transition temperature below about 300°, a working temperature below about 400° and exhibiting excellent resistance to attack by water and mild aqueous alkaline solutions, the glass consisting essentially, expressed in terms of mole percent on the oxide basis, of 15-35% $P_2O_5$, 1-25% $SO_3$, 30-55% ZnO, 0-25% $R_2O$, wherein $R_2O$ is selected from the group consisting of 0-25% $Li_2O$, 0-25% $Na_2O$, and 0-25% $K_2O$, and up to a total of 15% of optional ingredients in the indicated proportions selected from the group consisting of 0-10% $Al_2O_3$, 0-10% MgO, 0-10% CaO, 0-10% SrO, 0-10% BaO, 0-10% MnO, 0-10% transition metal oxides and 0-15% Cl+F, as analyzed in weight percent.

2. The glass as according to claim 1 wherein the amount of $SO_3$ ranges from 7-20%.

3. The glass according to claim 1 wherein the amount of $SO_3$ does not exceed 15%.

4. The glass according to claim 1 consisting essentially of 21-33 % $P_2O_5$, 9-17% $SO_3$, 35-51% ZnO, and 10-20% $R_2O$, wherein $R_2O$ is selected from the group consisting of 0-10% $Li_2O$, 0-15% $Na_2O$, and 0-10% $K_2O$.

5. The glass according to claim 1 consisting essentially of 24.8% $P_2O_5$, 12.5% $SO_3$, 40.7% ZnO, 5.3% $Li_2O$, 8.0% $Na_2O$, 5.8% $K_2O$, 1.5% $Al_2O_3$, 0.7% CaO, and 0.7% SrO.

TABLE IV

|  | 16 | 17 | 18 | 19 | 20 | 21 | 22 | 23 |
|---|---|---|---|---|---|---|---|---|
| $P_2O_5$ | 26.4 | 22.7 | 45.6 | 56 | 19 | 21.5 | 12.2 | 26.2 |
| $SO_3$ | 28.0 | 38.8 | 17.4 | 16 | 16 | 30.5 | 35.9 | 18.0 |
| $K_2O$ | 7.0 | 5.9 | 4.4 | 4 | 4 | 2.8 | 6.4 | 3.3 |
| $Na_2O$ | 7.0 | 17.1 | 4.4 | 7 | 29 | 2.8 | 6.5 | 14.8 |
| $Li_2O$ | 13.2 | — | 6.5 | — | 15 | — | — | 5.7 |
| ZnO | 18.4 | 15.7 | 8.7 | 33 | 33 | 42.4 | 39.1 | 32.0 |
| $B_2O_3$ | — | — | 3.2 | — | — | — | — | — |
| BaO | — | — | 9.7 | — | — | — | — | — |
| Melt. temp. (°C.) | 600-700 | 600-700 | 600-750 | 600-750 | unmelted | 875 | 800 | 800 |
| Glass appear. | cl. | cl. | transl./hygro. | cl./hygro. | — | cl. | cl. | cl. |
| $T_g$ (°C.) | 233 | 249 | 264 | 243 | — | >350 | — | — |
| Pull (°C.) | | | | | — | >450 | 375 | 375 |
| Dissolution rate (% wt. loss) | 40 | 80 | 0.2 | 51 | 51 | 0.2 | 100 | 1.0 |
| Appearance after boil | unconsol. white res. | unconsol. white res. | hazy glass | dissol. | unmelted | — | unconsol. white res. | sur. spall. |